United States Patent [19]

Stark

[11] 4,364,532
[45] Dec. 21, 1982

[54] APPARATUS FOR COLLECTING SOLAR ENERGY AT HIGH ALTITUDES AND ON FLOATING STRUCTURES

[75] Inventor: Virgil Stark, New York, N.Y.

[73] Assignee: North American Construction Utility Corp., New York, N.Y.

[21] Appl. No.: 98,517

[22] Filed: Nov. 29, 1979

[51] Int. Cl.³ .............................................. B64B 1/00
[52] U.S. Cl. .................................... 244/30; 60/641.8; 136/292; 126/438; 126/424; 126/440; 244/58; 244/159
[58] Field of Search ..................... 244/159, 1 R, 53 R, 244/30, 58, 31, 3, 2, 33, 17.25; 126/438, 424, 439, 440, 443; 136/245, 291, 292, 246, 248; 60/641

[56] References Cited

U.S. PATENT DOCUMENTS

| | | | |
|---|---|---|---|
| 776,106 | 11/1904 | Beurrier | 60/641 |
| 1,390,258 | 9/1921 | Geneste | |
| 1,993,414 | 3/1935 | Respess | 244/33 |
| 2,455,834 | 12/1948 | Ushakoff | 202/234 |
| 3,118,437 | 1/1964 | Hunt | 126/424 |
| 3,125,091 | 4/1964 | Sleeper, Jr. | 126/271 |
| 3,153,878 | 10/1964 | Smith | 244/31 |
| 3,357,898 | 12/1967 | Novakovich | 202/234 |
| 3,531,064 | 9/1970 | McCutchan | 244/31 |
| 3,822,692 | 7/1974 | Demarest | 126/440 |
| 3,986,936 | 10/1976 | Rush | 202/234 |
| 4,002,158 | 1/1977 | Radebold | 126/438 |
| 4,069,812 | 1/1978 | O'Neill | 126/439 |
| 4,078,747 | 3/1978 | Minovitch | 244/159 |
| 4,092,827 | 6/1978 | Schneider | 244/33 |
| 4,184,895 | 1/1980 | Oster, Jr. | 126/438 |
| 4,185,826 | 1/1980 | Ueng | 244/17.25 |

FOREIGN PATENT DOCUMENTS

| | | | |
|---|---|---|---|
| 237480 | 8/1911 | Fed. Rep. of Germany | 244/3 |
| 2611257 | 4/1978 | Fed. Rep. of Germany | 244/58 |
| 53-10031 | 4/1978 | Japan . | |

OTHER PUBLICATIONS

Cherry, "A Concept for Generating Commercial Electrical Power from Sunlight", 8th IEEE Photovoltaic Specialists, Conference, Aug. 4–6, 1970.
Appendix A, Ref. 2, Edwin, The Airfloat HL Project MIT FTL Rep. R–75-2, Jan. 1975.
Booda, "Space Plane Grows Into Family of Concepts", Aviation Week, Jun. 9, 1961, pp. 54–62, especially p. 59.
Chappell et al., Characteristics of a Water Absorber in Front of a Silicon Solar Cell", Univ. of Calif., Berkley, Dec. 15, 1975.

Primary Examiner—Galen Barefoot
Attorney, Agent, or Firm—Kenyon & Kenyon

[57] ABSTRACT

Disclosed is apparatus for collecting solar energy with means of producing electricity by concentrating solar energy on sets of photovoltaic cells to be either positioned at high altitudes and which may be fitted to balloons or to structures floating on water.

34 Claims, 6 Drawing Figures

APPARATUS FOR COLLECTING SOLAR ENERGY AT HIGH ALTITUDES AND ON FLOATING STRUCTURES

This invention relates to an apparatus for collecting solar energy at high altitudes and on floating structures.

As is known, various attempts have been made to utilize solar energy in order to meet various energy needs. For example, it has been known to use solar energy to heat a flow of water in a solar panel in order to obtain hot water for heating purposes. It has also been known to utilize photovoltaic cells to convert solar energy into electrical energy for various purposes. For example, it has been known that a photovoltaic cell normally produces about 0.06 watts for a peak irradiation of 100 watts per square centimeter at 25° C. However, the amount of electricity can be increased, by concentrating the incident solar rays on a photovoltaic cell as described in U.S. Pat. No. 4,134,393 and Continuation-In-Part No. 886,068, filed Dec. 30, 1978, now U.S. Pat. No. 4,191,594, the disclosures of both of said patents being incorporated herein by reference. For example, for a cell of 5 centimeters (cm) by 5 centimeters (cm), an irradiation efficiency of 55% and an output efficiency of 14%, such a cell receiving incident irradiation at a rate of 1000 watts per square meter per hour and over 30 times concentration can produce about 7 watts. That is, the cell produces more electricity as otherwise without concentration. Furthermore, concentration will not only be effective for the ultraviolet and luminous rays (up to 0.8 microns) bus also for the infrared rays (up to 2 microns). However, concentrated infrared rays will produce heat which will decrease the efficiency of electricity production by 0.4% for each 1° C. increase in temperature. Thus, the heat produced may be over 25° C., for instance with a concentration of 35 times the normal amount. Since silicon melts at 175° C., the efficiency of a cell based upon silicon would reduce down to zero. Accordingly, it becomes necessary to cool the cells at elevated temperatures. As described in U.S. Pat. No. 4,134,393 and U.S. Patent Application Ser. No. 44,901, filed June 4, 1979, the disclosure of which is incorporated herein by reference, this can be accomplished, e.g., by absorbing most of the infrared rays by a controlled flow, for instance of water, in a transparent tube surrounding the transparent tube in which the array of photovoltaic cells is disposed. A fluid at a controlled flow in the inside tube surrounding the cells within the collector will add to the absorption of infrared rays and cooling.

It is an object of the invention to utilize the cold air naturally occurring at heights above the earth to cool a solar energy system which utilizes photovoltaic cells instead of using flows of water for such purposes.

It is another object of the invention to convert concentrated solar energy into electrical energy at altitudes above the earth and use the electricity so produced for varied purposes.

Briefly, the invention provides an apparatus for collecting solar energy which is comprised of a collector means including at least one photovoltaic cell, at least one concentrator disposed in spaced relation to the collector means and means for positioning the collector means and concentrator at high altitudes above the earth.

By positioning the collector means at a high altitude above the earth, the cold air which is available at such heights is used to cool the photovoltaic cell, particularly where the cell receives a concentration of solar rays of over thirty (30) times the normal concentration. In this regard, it is known that the temperature decreases as the altitude over the earth increases. For example, temperatures at 10,000 feet (3,384 meters) are about −4.81° C.; at 16,000 (5,240 meters) about −16.68° C.; at 25,000 feet (8,202 meters) about −34.35° C.; and at 30,000 feet (9,842 meters) about −44.44° C.

The means for positioning the collector means and concentrator at high altitudes may be in the form of a dirigible, a skyship, a balloon or the like referred to hereinafter as a balloon. Other means can also be used which can be positioned at high altitudes such as skylabs, airplanes and the like.

As is known, balloons which are filled with a nonflammable gas such as helium, are becoming a useful way of transportation. Generally, the fuel consumption of such a balloon is about one-third that required by jet planes of similar capacity. For example, one balloon has a diameter of 45 meters and 250 meters long and is constructed of a number of balloons filled with helium placed inside a large balloon envelope. Such a balloon can lift 1 kilo for each cubic meter of helium capacity i.e. 500 metric tons for 500,000 cubic meters.

It is also known to provide balloons with helicopters. For example, in one case, two balloons are connected with a metal support on which a helicopter is mounted. In another case, it has been known to provide four balloons each with a capacity of 250,000 cubic meters with eight helicopters to allow the lifting of 300 tons.

While the speed of a balloon compared to a jet liner is much less, it is estimated that a balloon having the same load capacity as a jet liner would require less fuel, for example two-thirds less fuel.

About 70% of the power of an airplane is used for lifting and keeping the airplane in the air and only about 30% for propulsion. A balloon, however, is statically lifted by the lighter than air helium allowing much larger loads of lifting and keeping them in the air with small power required for advancing at much smaller speed than airplanes. Balloons are of special interest for moving substantial loads within important areas of the globe which benefit from low seasonal variation of incident solar energy, high irradiation, long hours of sun during the year, altitudes with relatively low wind velocities. Large areas of the globe especially between 15° and 30° latitude north-south may be important potential areas for transportation of heavy loads by balloons. Such sites include underdeveloped areas with yet unexploited resources with very few rail and road connections as parts of Africa, Central, Sourth America, Australia, etc. Electric propulsion of balloons instead of fuel engines will reduce noise and pollution.

Electricity could be stored in batteries if such became lighter and cheaper as is expected.

In accordance with the invention, a composite lens system and a collector means could be considered with a plurality of photovoltaic cells which are used to produce electricity for driving a DC motor mounted e.g. on the envelope of a balloon for propelling the balloon. In this regard, the electricity is used as an alternative energy source to a fossil or other type of fuel. Thus, when solar rays are available, the electric motor will be used and, for times without sunshine, only the engine fuel will be used. This will not only save fuel but also will reduce the storage space required for the fuel and the weight of the fuel. Assuming a consumption of fuel of 2 kilograms per horsepower for a helicopter or small airplane with 450 horsepower, the fuel consumption would be 900 kg per hour. The storage will depend on the speed of the plane, the length of the journey and the reserve of fuel required.

In one embodiment, a balloon of a length of 250 meters long and a diameter of 45 meters can be provided with a cencentrator formed of composite lenses, with a central lens, such as a Fresnel lens or a lens with reflective blades, for instance, with side lenses with reflective blades giving a concentrator of a composite width of 200 cm and 240 cm length or similar, the central side lenses concentrating the solar energy with the same focus target. The lenses will be mounted on frames with provisions to track the elevation location of the sun from east to west and also, if so selected, from north to south for seasonal tracking, such as described in U.S. Patent Application Ser. No. 44,901 filed June 4, 1979.

The frames surrounding the composite lenses can be moved for elevation tracking, for instance, in pairs on three sinusoidal rails pulled along a central sinusoidal rail and supported by the two outside sinusoidal rails. A collector system will be provided having arrays of photovoltaic cells of, for instance, five cm by five cm (e.g. 48 cells per unit) which are inserted in transparent tubes to be cooled by low temperature outside air of, for instance, $-16°$ C. at an altitude of about 5200 meters. The focal length will be about 100 cm or 150 cm with a high concentration of solar energy. The irradiation will be high at such altitude with practically no diffused energy. At a direct irradiation assumed of about 1000 watts per square meter per hour on a concentrating surface of solar rays of 4.88 square meters (2 m $\times$ 2.44 m) per unit, with an irradiation efficiency of 55% and a conversion efficiency of 14% in the photovoltaic cells, the production of electricity per cell would be about 7 watts instead of a much lower production of electricity per cell as above without concentration. For 48 cells per unit, the production of electricity will be about 336 watts. This will require about 3 units to produce one kilowatt per hour.

Considering a focal distance of one meter, the distance between the two sets of sinusoidal rails will be 3 meters. The distance between the two frames pulled on three rails will be about 5 meters allowing two arrays of photovoltaic cells each with 48 cells. Assuming arrays covering 235 meters of 250 meter length of the balloon, this will allow 47 double units (235:5) of 94 units producing 31500 watts (94$\times$336). Assuming that 36 meters of the 45 meters of the circumference could be covered by sets of units of 3 meters this will allow about 12 sets of arrays or the production of 378 kw (31.5$\times$12) or 500 HP (378$\times$1.34 HP/kw).

The amount of electricity produced can be used by an electric motor of about 500 horsepower, similar to the engine used by an airplane or helicopter attached to the balloon. Helicopters such as McDonald Douglas XHJD-1, Sikorsky RS and Bendix J each have 450 HP. The savings in fuel using solar energy would be about 1000 kg/hour. Thus, if the balloon is used 1,500 hours per year, this will represent a savings of 1500 tons per year per balloon. This can result in a substantial economic savings in the cost of the fuel and allow short amortization of the investment in the solar energy system.

The weight of the solar system and electric motor compared with the weight of an airplane fuel engine and the fuel storage will be similar depending however on the location, the season, the length of the journey and the fuel storage required.

Alternatively, the space between the concentrator and the photovoltaic cells enclosed in a transport tube at a distance of about one meter (1 m) or 1.5 m from the cencentrator may be filled by a transparent bag filled with helium. This will allow the helium to increase in volume under the heat generated and thus increase the lifting capacity of the balloon.

The balloons can be either stationary or propelled by an electric motor or fuel engines or both as shown herein before. Stationary balloons remain in a limited space of, for instance, 400 meters around the lifting center.

Stationary balloons are used for transmission and control of electric waves such as for radio, television, etc. The electricity to be produced by the photovoltaic cells of the balloons could be used for other purposes than for moving an electric motor. For example, the electricity can be used both for an electric motor to counter and oppose winds and also for the requirements of the transmission systems.

In a further embodiment, the solar energy collector apparatus can be used to produce electricity for a Satellite Solar Power Station (SSPS). A geostationary satellite would be constructed in space at about 36000 km in orbit and synchronized to the earth rotation so that piloted microwave beam links could be maintained between the satellite and a ground station. The photovoltaic network with millions of cells of for instance 5 km $\times$ 10 km will be required to produce a typical power plant of 5 GW (5 billion watts) reported as a minimum economically feasible plant. Electricity will be converted into microwaves by millions of microwave generator tubes. Part of the power released by the microwave generators is used to condition and to match the output of the solar ray cell array to the input requirements of the microwave generators and to do it optimally without dissipating power. The microwaves generated are transmitted to an antenna, of for instance, 1 km diameter. The microwaves are then directed with a transmission frequency such as 2.45 GH (2.45 billion Hertz) by a beam of about 1 km width to an earth bound ground station of elliptical form (rectenna) of, for instance, 10 km $\times$ 13 km. The microwaves would be converted into electricity at the ground power station. A microwave pilot beam is sent back by the rectenna to the satellite microwave antenna to phase and control the microwave beam allowing fail-safe operation and the focusing of the microwave beam.

The SSPS has the advantage of collecting the solar energy day and night, i.e. about 1340 w/m2 during 8700 hours per year. However, the SSPS has environmental problems. It is estimated that it will take 15 years and many billions of dollars to realize a first SSPS station. The risks of use of the SSPS system include interference for radio frequency and other satellite communications passing through the beam area and harmful biological and heat effects. The large size of the SSPS systems make them uniquely vulnerable to sabotage, blackmail and military attack.

A concentrating solar system, as above, with arrays of photovoltaic cells could be provided on structures similar to thee ones considered for the SSPS and thus reduce—by concentration of solar energy—the number of photovoltaic cells. Instead of rotating with the earth at altitudes of about 36000 km, a structure could be provided with photovoltaic cells and means to change electricity into microwaves for subsequent transmission to earth. Such a structure could be lifted and supported by proper balloons at a much lower altitude for instance of only 5 km, preferably over mountains, or at selected altitudes with low winds, referred hereinafter as BPS (Balloon Power Station). Proper means are to be provided for opposing the winds for positioning and directing the structure and for proper transmission of the microwaves to selected locations on earth to provide electricty from such microwaves. However, whereas for the SSPS at about 36000 km altitude very large amounts of electricity (such as 5 billion watts) will be transmitted requiring reception rectennas, much smaller units at lower cost can be provided with faster realization by applying the above alternate BPS with static balloons.

There are dangers to the environment such as heating along the path of microwave transmission waves from SSPS to the earth depending on the intensity and thus the power transmitted. This risk can be substantially reduced in case of smaller amounts of electricity transmitted by the less dense microwaves by SSPS.

Heat is dissipated by the photovoltaic cells, also by the power conditioning and finally by the microwave generators. As heat is dissipated in the orbit only by radiation and not by convection such as to ambient cold air, means are provided to allow dissipation of heat such as pyrolytic graphite radiation or radiating fins for the SSPS system. Heat can be dissipated better by the BPS system which will allow dissipation of heat not only by radiation but also by convection to the ambient very cold air. This will reduce the requirements of BPS for heat transmission means.

The possible risks shown above for the application of SSPS are minimized by the BPS system.

An alternate for BPS is to provide a number of sustaining large static balloons filled with helium inserted into a large envelope covering a number of such balloons and allowing a large support to sustain the structure for the solar concentrating system and arrays of photovoltaic cells. Several supported balloons can be provided around the structure to be supported at selected locations. Several structures with concentrating solar systems and arrays of photovoltaic cells with supporting balloons can be connected in series or in parallel.

A large balloon could be provided with the structure with photovoltaic cells and a solar concentrating system inserted in an inside lower arranged partition of the balloon envelope. Directional rudders and/or wings will be provided to position the structure at selected position and direction. The transmission of electricity to the ground station on each can be done either by microwave or thermal means or laser means or directly by electric cables. A BPS system with static balloons can be connected to earth by anchored cables.

Means can be provided to insure that the solar cells do not receive the solar rays before reaching the selected altitude in order to prevent burning of the cells. This can be done by insuring that the panels of the concentrators are inclined before reaching the selected altitude or by convering the lenses with a removable protective sheet which can be pulled out automatically upon reaching the selected altitude.

The apparatus of the invention can be used in various other manners than those described above. For example, the apparatus may be used to produce electricity with a small balloon, for example occupying 50,000 cubic meters, which tows a larger balloon, for example having 4,000,000 cubic meters, filled with natural gas or another gas which is lighter than air. In this case, alternatively electric motors or engines fed by natural gas will pull the larger balloon, for example at altitudes of 2,000 meters. In this way, natural gas can be shipped over oceans at much lower costs than the liquifaction of natural gas which requires transportation as a liquid under very low temperatures as well as vaporization at the location of use. The solar energy conversion apparatus can be installed on the envelope of the larger balloon and thus save natural gas used for such shipment. This innovation may have an application or special interest for the natural gas released by drilling wells on platforms located on oceans or seas by using such natural gas instead of burning it.

Structures supporting arrays of concentrators and arrays or photovoltaic cells to produce electricity as above can be floated on water, such as rivers, lakes, seas. Distillation of saltwater can be combined with above to distilled water in addition to electricity.

These and other objects and advantages of the invention will become more apparent from the following detailed description and appended claims taken in conjunction with the accompanying drawing in which:

Figure 1:
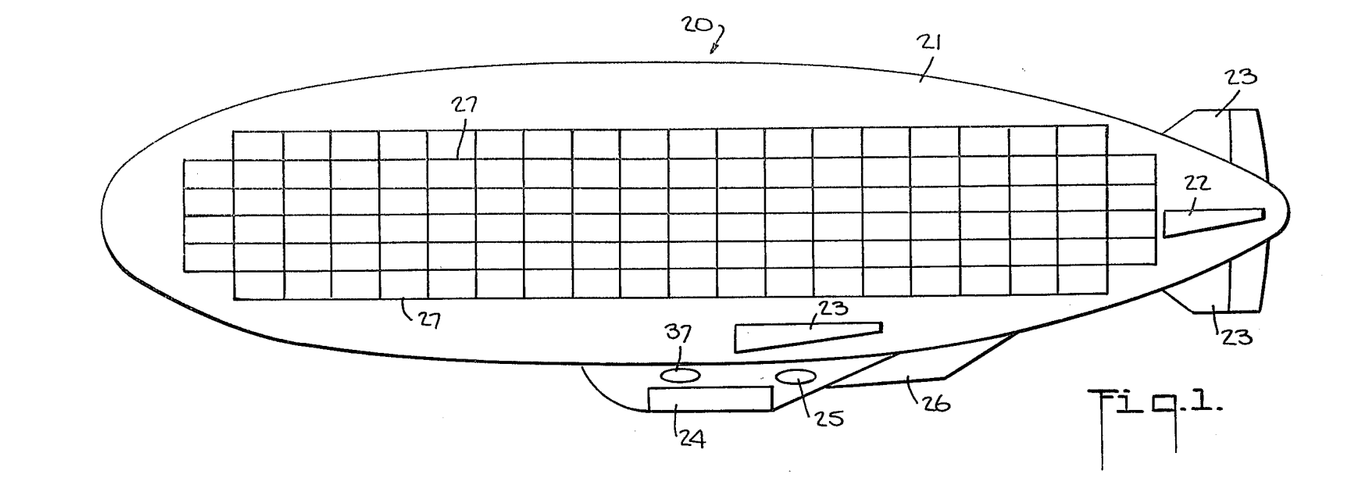
FIG. 1 illustrates an apparatus according to the invention on a navigable balloon.

Referring to FIG. 1, the balloon 20 is constructed in a conventional manner, for example being provided with an inflatable envelope 21 for containing a lighter-than-air gas, such as helium, a rudder 22 and lateral wings 23. In addition, a gondola 24 is supported on the underside of the envelope 21 in known manner. Likewise, a fuel engine 25 in mounted on the balloon 20 for propelling the balloon 20. In this regard, the engine 25 may drive propellers (not shown) or may be of the jet engine type. A suitable fuel storage 26 is also provided for supplying fuel such as gasoline or a gas to the engine 25.

In accordance with the invention, the balloon 20 is provided with an array of photovoltaic cells either in series or, for example, 47 double composite units, or in parallel, for example in 12 sets of arrays.

The photovoltaic cells 27 may be disposed longitudinally of the balloon envelope 21 so as to receive incident rays of sunlight for conversion into electrical energy. As such, the photovoltaic cells 27 act as a collector means for converting radiant energy into electrical energy.

Figure 2:
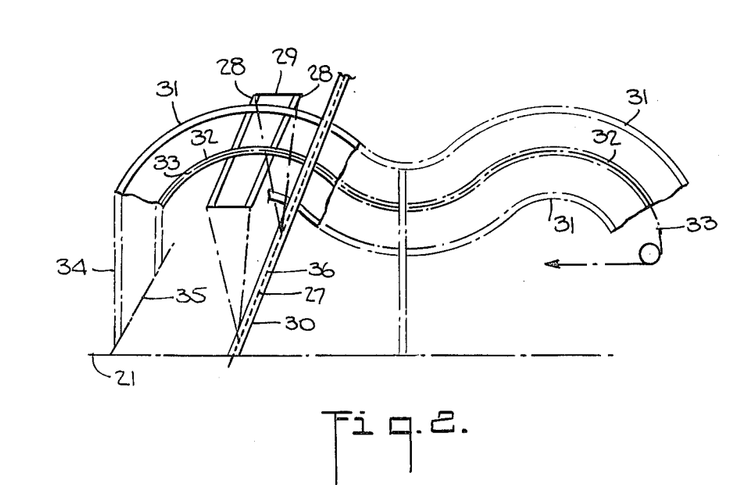
FIG. 2 illustrates a collector means and a concentrator of an apparatus for collecting solar energy in accordance with the invention.

In addition, a concentrator 28 is disposed in spaced relation to the collector means, i.e. the photovoltaic cells 27 in order to concentrate a plurality of solar rays onto the cells 27. As shown in FIG. 2, a pair of concentrators 28 may be mounted in a frame 29 for directing incident solar rays onto the photovoltaic cells 27. As indicated, the photovoltaic cells 27 are disposed within a transparent tube 30 through which a coolant may be circulated for cooling the cells 27 and maintain the cells at a suitable operating temperature. Each frame 28 may be provided with a composite lens including a central lens for example made as a longitudinal Fresnel lens or lens with reflector slides, and two side lenses constructed of inclined reflective blades, each of which has the same focus target, i.e. the cells 21, as the central lens.

As shown, the frames 28 are mounted on rails 31, 32 of sinusoidal configuration. As indicated, the frames 28 extend across the rails 31, 32 so that the extreme frame ends are carried on the side rails 31. In addition, a cable or similar 33 is disposed in the central rail 32 and is connected to the frame 28 so as to permit pulling of the frame along the rails 31, 32. The mounting of the frames 28 on the rails 31, 32 permit tracking of the frames 28 in accordance with the location of the sun during the day such that the solar rays are vertically incident at all times on the central lens and reflective blades. At the end of the solar day, the cable 33 is used to return the series of frames 28 to the initial morning position.

In order to move the cable 33, a suitable electrical device such as an electric motor (not shown)) driven by electric double cells can be utilized. As shown in FIG. 2, the various rails 31, 32 are supported via suitable supports 34 on grids 35 over the envelope 21 of the balloon 20.

As also indicated in FIG. 2, the cells 21 provide a longitudinal focus 36 for concentrating the solar rays thereon. Also, the transparent tube 30 is fixed on the envelope 21 of the balloon 20.

Referring to FIG. 1, the balloon is also provided with an electric motor 37 which is connected to the various cells 27 to receive electricity therefrom. The motor 37 is in turn used for propelling the balloon 20 when in operation. For example, the motor 37 may be connected to the engine 25 for driving a series of propellers (not shown).

Since the balloon 20 is provided with both an electric motor 37 and a fueled engine 25, the balloon 20 can be driven by one or the other in a selective manner. For example, during daylight hours, the balloon can be driven by the electric motor which is supplied with the electricity from the various photovoltaic cells 27. During the absence of sun, the balloon 20 can be driven via the fueled engine 25.

Figure 3:
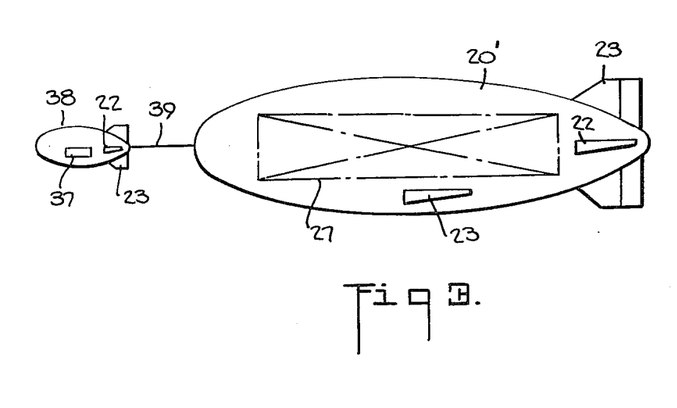
FIG. 3 illustrates an apparatus according to the invention wherein a small sized balloon is used for towing a larger size balloon in accordance with the invention.

Referring to FIG. 3, a balloon 20' of a construction similar to the above described balloon 20 can be towed by a smaller balloon 38. In this case, the balloon 20' need not have an engine 37 and motor 25 mounted thereon but would be provided with a rudder 22 and lateral wings 23 as above for navigational purposes. In addition, the balloon 20' is provided with a solar collector means 27 and concentrators as described above for collecting and converting solar radiation into electrical energy. The towing balloon 38 is provided with an electric motor 37 as above and a fueled motor (not shown) as above. Also, the electric motor 37 is connected to the photovoltaic cells 27 on the towed balloon 20' so as to receive electrical energy therefrom for driving of the engine 37. In addition, a suitable means such as a cable 39 is provided for towing of the balloon 20' behind the motorized balloon 38.

The towed balloon 20' can be filled within a suitable lighter-than-air gas which requires transportation from one place to another. For example the balloon may be filled with natural gas to be transported over large distances. In this case, some of the natural gas can be supplied with a suitable conduit to the fueled engine (not shown) of the towing balloon 38 for propulsion purposes when the electric motor 37 is not being driven.

Further, the lighter than air gas, such as natural gas, can be contained in a set of plastic tubes held together by flexible connections and having, as balast, containers filled with water which can be emptied as required to change the altitude of the balloon. Means can also be provided to fill and expel the gas, such as natural gas, from the balloon. To this effect, the set of plastic tubes as above inserted in a flexible envelope could be turned around means, such as a central pilot or tower surrounding the envelope, to allow filling of the flexible plastic tube inside the balloon's envelope with gas while gradually distributing containers filled with water to function as ballast. When the gas is discharged at a receiving locations similar means such as around a tower are provided allowing the discharge. This will allow its descent at the receiving location by releasing only a small quantity of light gas. The small towing balloon may return empty to take another cargo thus reducing the fuel consumption.

Also, a gas such as helium provided for lifting and holding the balloon at altitudes can be contained in sets of plastic tubes in flexible plastic envelopes which may freely extend during lifting and collapse during descent following an increase and decrease in volume of the lighter than air gas. In addition, use may be made of counter-blow and directive means, such as movable rudders and wings, to maintain the balloon in a relatively stationary position. The balloon will only be filled partially with helium at its departing location so as to take its filled form at the selected altitude of travelling. Regarding the electric motor activated by the photovoltaic cells, it has to be noted that more than one electric motor, possibly of different powers and propellor sizes, will be required to act progressively together. Electric motors are to be used to counterblow in directions contrary to prevailing winds. The propellor of the electric motor or engines will throw a mass of air or fluids stored in the balloon backwards of the motor or engine and against the direction of the winds.

It is to be noted that the electric motor provided on a balloon can be used to counter-blow in a direction to the wind in order to permit the balloon to be maintained relatively stationary for metorological purposes for example.

Figure 4:
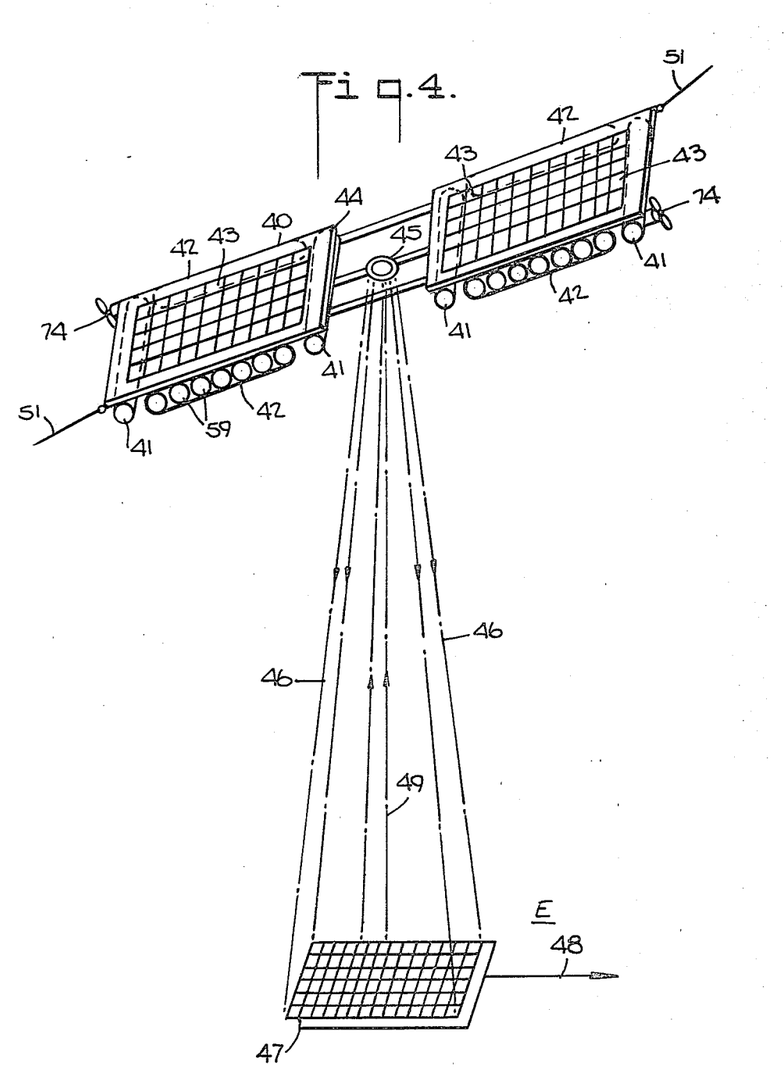
FIG. 4 illustrates a Balloon Power Station (BPS) at high altitudes in the atmosphere for transmitting electricity by microwaves to a terrestrial power station.
Figures 5, 6:
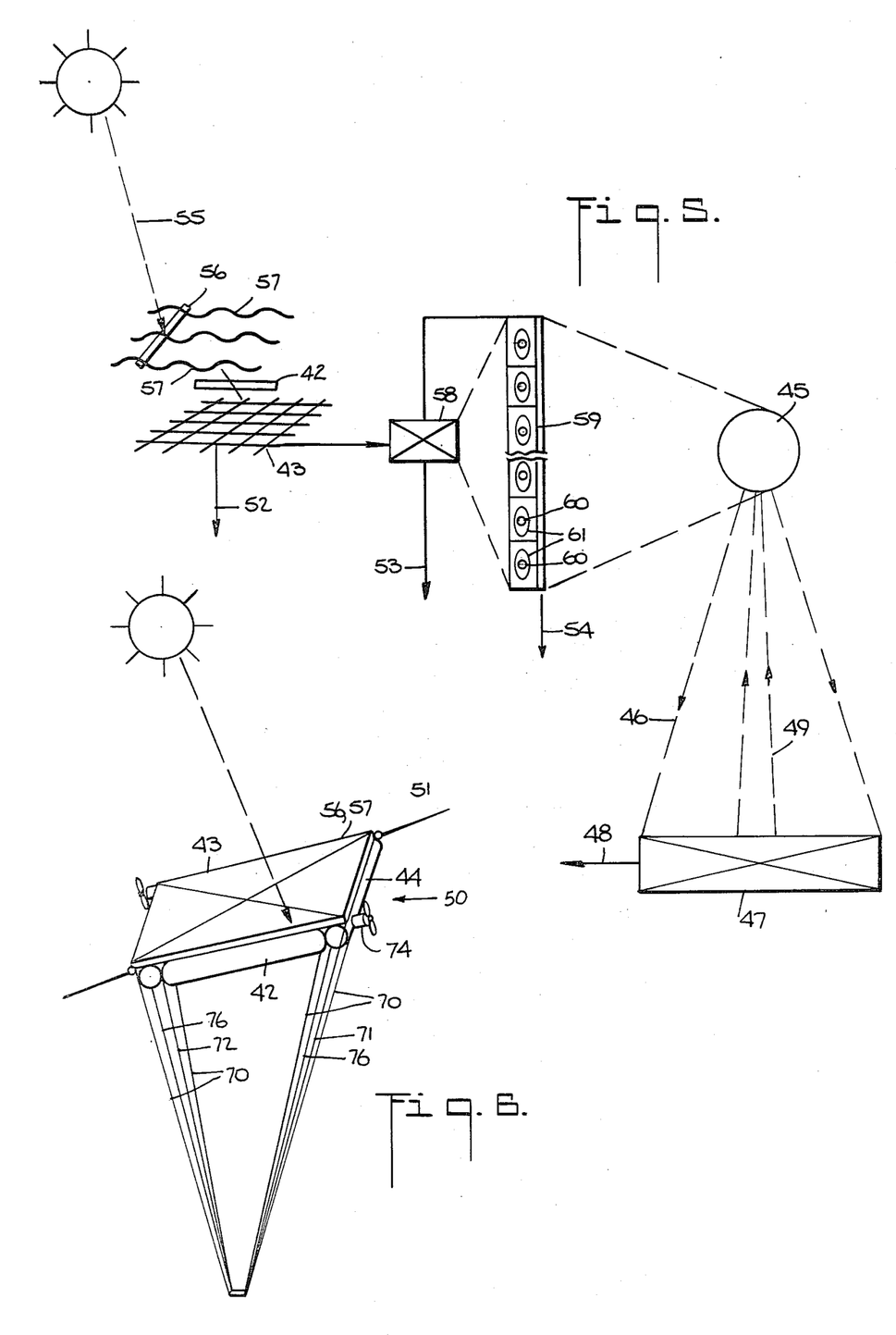
FIG. 5 schematically illustreas a BPS station in accordance with the invention.
FIG. 6 illustrates a BPS station lifted and held in the atmosphere by cables and direct transmission of electricity without means of microwaves in accordance with the invention.

Referring to FIG. 4, a Balloon Power Station (BPS) 40 can be lifted and supported by balloons 41, 42 filled with helium. A plurality of smaller balloons 59 can also fill a larger envelope 42. Arrays of photovoltaic cells 43 provided with concentrators of solar energy are mounted on structures 44. DC electric current can be converted into microwaves by microwave generators, such as linear beam tubes with electrodes as shown in FIG. 5. The microwaves will be transmitted and concentrated in an orbit antenna 45. The microwaves of for instance 2.45 G Hertz will be transmitted by beams 46 to an antenna (rectenna 47) located on the earth's surface (E). Provision is also made, as shown in FIG. 5, to change the microwaves into electricity 48. A pilot beam 49 will control phase and direct the transmission direction of the microwave beam 46. Power conditioning by power recycling is provided, shown in FIG. 5, to condition the output of the microwave arrays to match the input required for the microwave generators. Radiators 61 are provided to assist in dissipating the heat released by the microwave generators, the power conditioner and photovoltaic cells. Directional rudders 51 are also provided.

Referring to FIG. 5, when the balloon power plant system (BPS) is in use, solar rays 55 are incident on arrays of solar concentrators 56 tracking the sun on sinusoidal rails 57 and producing DC electricity through arrays of photovoltaic cells 43. The envelope 42 supporting the photovoltaic cells 43 is mounted between the concentrator 56 and the photovoltaic cells 43 whereby heating of the helium in the bags in the envelope which are in heat transfer relation with the cells causes an increase in the volume of the helium and a corresponding increase in the lifting capacity of the balloon. The electric current will be converted into microwaves in an array of microwave generators formed by proper tubes 60 surrounded by pyrolytic graphite radiators 61 or similar to dissipate the heat 54. The output of the photovoltaic cells 43 is conditioned by suitable means 58 to match the input requirements of the microwave generators with provisions, to dissipate the heat 53 in addition to provisions to dissipate the heat 52 of the photovoltaic cells 43. The microwaves are concentrated in the antenna 45 which transmits the microwave beam 46 to the earth rectenna 47. A pilot beam 49 controls the phase and position of the antenna 45. The microwaves are converted into electricity at the rectenna 47.

The BPS system as shown in FIG. 6 may also consist in having a structure 50 covered with a concentrating solar system 56, 57 and arrays of photovoltaic cells 43 lifted and held statically in the atmosphere by balloons 42, 44 held at selected altitudes over the earth for instance 2 km preferably over mountains and possibly by cables 70. The electricity produced by the concentrated solar energy through the photovoltaic cells could be transmitted to a power station on earth by at least one insulated electric cable 71, instead of by microwave systems. The electric motors 74 could be driven either by electricity from the photovoltaic cells or through an electric cable 72 provided from a power station or electric transformer located on earth. A fluid, such as water, can be pumped by flexible lines 76 at selected periods into containers of the balloon used for example as removable balast. Water can be released at selected periods from the accumulated storage in the balloon to the ground either using the same or other lines 76. Considering the important differences, the down falling water can be used to produce power in hydro-electric turbines. This can be done especially during nights when colder air and no sunshine prevail.

In another embodiment, arrays of concentrating lenses, for instance of composite construction, allowing high concentration, over 35 times, focus the solar energy on arrays of photovoltaic cells inserted into transparent tubes preferably inserted into another set of transparent tubes through which water circulates for absorbing the concentrated infrared rays which produce heat. This will allow the concentrated ultraviolet and luminous rays of up to 0.8 microns in wavelength to produce electricity without reduction because the heat otherwise generated by the infrared rays is dissipated.

The above assemblies could be installed on floating means such as ships, including cargo ships, tankers, barges or boats or structures between boats such as catamarans, aircraft or similar. They could also be installed on large stable structures floating on water including lakes, rivers, seas and oceans producing electricity as Floating Solar Power plants (FSP). The water can be used to circulate in the transparent tubes indicated above and absorb the infrared rays and cool the photovoltaic cells allowing high production of electricity from concentrated solar energy; the water could be used for other purposes after being heated by the infrared rays as above.

The ships, cargo ships, boats, etc. could have separate added panels such as side panels tilted properly to provide additional structures for supporting the solar assemblies as indicated above. Such panels may, if so selected, float or be slightly submerged in the surrounding water and may use the water for cooling the photovoltaic cells as above.

The FSP power plant can be used not only to produce electricity but also to distill saltwater and produce water as described in U.S. Patent applications Ser. No. 44,901 of June 4, 1979 and Ser. No. 915,001 of June 13, 1978, now U.S. Pat. No. 4,270,981. The disclosure of application Ser. No. 915,001 is incorporated herein by reference. To this effect, sets of transparent spaced double plates will be provided between the basin containing undulated plates on which salt may circulate with arrays of photovoltaic cells located in the valleys of the undulations and the concentrating lens system above such double plates. The vapor will condense on the surface of the lower plate and the heat of condensation will be recovered by water circulated at selected flow in the space between the double plates. Structures as above can be provided with means to float on the surrounding water and anchored on the bottom of the seas and oceans and the like and the ambient saltwater can be used to produce distilled water and electricity by the photovoltaic cells with saltwater cooling the tubes in which the cells are installed. Products such as salt, magnesium chloride etc. or chemicals such as chlorides, sodium separated by electrolysis from salt or hydrogen and oxygen produced from electrolysis of water or chemicals such as ammonia etc. could be produced on large floating structures using means to produce electricity and/or heat from solar energy.

What is claimed is:

1. An apparatus for collecting solar energy comprising a collector means including a plurality of photovoltaic cells;
   at least one concentrator having a plurality of lenses disposed in spaced relation to said collector means;
   means for positioning said collector means and said concentrator at high altitudes above the earth; and
   means for moving at least said lenses along a sinuous curved path independently of said photovoltaic cells and of said positioning means to track the sun.

2. An apparatus as set forth in claim 1 wherein said means is an airship.

3. An apparatus as set forth in claim 1 wherein said means is at least one balloon.

4. An apparatus as set forth in claim 1 wherein said means is a satellite Solar Power Station (SSPS) located in the orbit and synchronized with the earth's rotation.

5. An apparatus as set forth in claim 1 wherein said means is a Balloon Power Station (BPS) lifted and held in the atmosphere at selected altitudes by at least 1 static balloon.

6. An apparatus as set forth in claim 5 where said balloon is held by at least one cable connected to the earth.

7. An apparatus as per claim 6 with means to transmit the electricity to the power station on earth by electric insulated cables.

8. An apparatus as set forth in claim 4 or 5 with means for dissipating heat generated in said photovoltaic cell.

9. Apparatus as set forth in claim 5 which further comprises sets of plastic tubes containing a lighter than air gas, flexible connections holding said tubes together and balast containers for filling and emptying with water to change the altitude of said balloon.

10. An apparatus as set forth in claim 1 which further comprises a transmission means for transmitting electricity from said cell to earth.

11. An apparatus as set forth in claim 10 wherein said transmission means transmits electricity by microwaves.

12. An apparatus as set forth in claim 1 wherein said means for moving comprises sinusoidal rails on which said lenses are disposed to move.

13. In combination,
a navigable balloon;
at least one electric motor mounted on said balloon for propelling said balloon; and
an apparatus mounted on said balloon for collecting and converting solar energy into electrical energy, said apparatus including a collector means including a plurality of photovoltaic cells connected to said motor to deliver electrical energy thereto, at least one concentrator having a plurality of lenses disposed in spaced relation to said collector means for concentrating a plurality of solar rays onto said photovoltaic cells, and means for moving at least said lenses along a sinuous curved path independently of said photovoltaic cells and said balloon to track the sun.

14. The combination as set forth in claim 13 wherein said collector means includes transparent tube and a plurality of said photovoltaic cells within said tube.

15. The combination as set forth in claim 13 in which said balloon comprises a plurality of transparent bags of helium disposed between said concentrator and said cells whereby heating of the helium in said bags in heat transfer relation with said cells causes an increase in volume of the helium and a corresponding increase in lifting capacity of said balloon.

16. The combination as set forth in claim 13 which further comprises a fuel engine mounted on said balloon for propelling said balloon in an alternating manner with said electric motor.

17. The combination as set forth in claim 13 which further comprises a plurality of lightweight electric batteries supported on said balloon and connected to said photovoltaic cells to receive and store electricity produced in said cells.

18. The combination as set forth in claim 13 which further comprises a structure mounting said apparatus thereon, said balloon including a plurality of bags of helium inserted in an envelope at selected positions to support said structure at high altitude.

19. The combination as set forth in claim 18 which further comprises means to mount said structure in an outer part of said balloon at a lower part than the other parts of said balloon.

20. Apparatus as set forth in claim 18 which further comprises a flexible electric cable for transmitting electricity from a ground station to said structure to drive said electric motors to maintain said balloon mostly stationary to counteract winds especially during hours without sun.

21. Apparatus as set forth claim 18 in which said balloon comprises flexible plastic film envelopes containing a gas lighter than air to allow the expansion of the gas when lifting said balloon and contractions of the gas when descending.

22. Apparatus as set forth in claim 18 which further comprises means to pump water through a flexible tube from ground to said balloon and means to direct water from said balloon to ground.

23. Apparatus as set forth in claim 18 which further comprises means to use the altitude between the balloon and the ground to produce hydro-electric power on the ground.

24. The combination as set forth in claim 18 which further comprises means to convert the electrical energy produced in said apparatus into microwaves for transmission to earth and subsequent conversion of the microwaves into electricity.

25. The combination as set foth in claim 13 wherein said means for moving comprises sinusoidal rails on which said lenses are disposed to move.

26. In combination,
a first balloon adapted to be filled with a lighter than air gas;
an apparatus mounted on said first balloon for collecting and converting solar energy into electrical energy, said apparatus including a collector means including a plurality of photovoltaic cells for converting radiant energy into electricity and at least one concentrator having a plurality of lenses disposed in spaced relation to said collector means for concentrating a plurality of solar rays onto said photovoltaic cells;
means for moving at least said lenses along a sinuous curved path independently of said photovoltaic cells and said first balloon to track the sun;
a second balloon filled with a lighter than air gas and being of smaller size than said first balloon;
an electric motor mounted on said second balloon for propelling said second balloon, said motor being connected to said cells to receive electricity therefrom; and
means connecting said second balloon to said first balloon for towing of said first balloon behind said second balloon.

27. A combination as set forth in claim 26 wherein said first balloon is filled with natural gas.

28. The combination as set forth in claim 26 which further comprises means for filling and emptying said first balloon with gas.

29. The combination as set forth in claim 26 which includes a plurality of said electric motors on said second balloon.

30. Apparatus as set forth in claim 26 further comprising an envelope mounted on said balloon and having a plurality of flexible tubes therein and means for filling or emptying gas and/or water into or from said flexible tubes.

31. The combination as set forth in claim 26 wherein said means for moving comprises sinusoidal rails on which said lenses are disposed to move.

32. An apparatus for collecting solar energy comprising
a collector means including a plurality of photovoltaic cells for producing electricity;

at least one concentrator having a plurality of lenses disposed in spaced relation to said collector means;

means for positioning said collector means and said concentrator at an elevated position to permit cooling of said cells by cool air; and means for automatically moving said lenses independently of said means for positioning and said photovoltaic cells to track the sun, said means for moving including a plurality of sinusoidal rails for guiding said lenses thereon along a sinusoidal path.

33. An apparatus as set forth in claim 32 wherein said latter means is a balloon and which further comprises means for directing said balloon in a given direction.

34. An apparatus as set forth in claim 33 wherein said means for directing includes a rudder and directing sidewings.

* * * * *

UNITED STATES PATENT AND TRADEMARK OFFICE
CERTIFICATE OF CORRECTION

PATENT NO. : 4,364,532
DATED : December 21, 1982
INVENTOR(S) : Virgil Stark

It is certified that error appears in the above—identified patent and that said Letters Patent is hereby corrected as shown below:

Col. 1, line 37 change "25°C," to --250°C--

Signed and Sealed this

Twenty-sixth Day of April 1983

[SEAL]

Attest:

Attesting Officer

GERALD J. MOSSINGHOFF

Commissioner of Patents and Trademarks